US012615347B2

(12) United States Patent
Deng et al.

(10) Patent No.: US 12,615,347 B2
(45) Date of Patent: Apr. 28, 2026

(54) MULTI-CAMERA VIDEO STREAM SCORING AND SELECTION FOR IN-PERSON CONFERENCE PARTICIPANTS

(71) Applicant: Zoom Video Communications, Inc., San Jose, CA (US)

(72) Inventors: Anna Deng, San Jose, CA (US); Yanjia Duan, Milpitas, CA (US); Juntao Feng, Hangzhou (CN); Tianming Gu, Hangzhou (CN); Cynthia Eshiuan Lee, Austin, TX (US); Bo Ling, Saratoga, CA (US); Chong Lv, Hangzhou (CN); Jeffrey William Smith, Layton, UT (US); Menglin Wang, Hangzhou (CN); Huixi Zhao, San Jose, CA (US); Xingguo Zhu, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 184 days.

(21) Appl. No.: 18/516,194

(22) Filed: Nov. 21, 2023

(65) Prior Publication Data

US 2024/0089405 A1 Mar. 14, 2024

Related U.S. Application Data

(63) Continuation of application No. 17/701,126, filed on Mar. 22, 2022, now Pat. No. 11,882,383.
(Continued)

(51) Int. Cl.
| | |
|---|---|
| *H04N 7/15* | (2006.01) |
| *G06V 40/10* | (2022.01) |
| *H04N 23/90* | (2023.01) |

(52) U.S. Cl.
CPC ............. *H04N 7/15* (2013.01); *G06V 40/103* (2022.01); *H04N 23/90* (2023.01)

(58) Field of Classification Search
CPC .......... H04N 7/15; H04N 23/90; H04N 7/147; G06V 40/103; G06V 40/10
See application file for complete search history.

(56) References Cited

U.S. PATENT DOCUMENTS

| | | | |
|---|---|---|---|
| 5,774,591 | A | 6/1998 | Black et al. |
| 5,802,220 | A | 9/1998 | Black et al. |
| | | (Continued) | |

FOREIGN PATENT DOCUMENTS

| | | |
|---|---|---|
| GB | 2594761 B | 5/2022 |
| WO | 2021243633 A1 | 12/2021 |
| | (Continued) | |

OTHER PUBLICATIONS

International Search Report and Written Opinion mailed on Jul. 4, 2022 in corresponding PCT Application No. PCT/US2022/024820.
(Continued)

*Primary Examiner* — Yosef K Laekemariam
(74) *Attorney, Agent, or Firm* — Young Basile Hanlon & MacFarlane, P.C.

(57) ABSTRACT

A best available video stream is determined for each of multiple conference participants within a conference room including multiple cameras based on scores determined for video streams obtained from the cameras. The scores are determined based on representations of the conference participants within the video streams, for example, based on percentages of conference participant faces visible within the video streams, directions of conference participant faces relative to the cameras, directions of eye gaze of the conference participants relative to the cameras, and/or degrees to which conference participant faces are obscured within the video streams. The best available video streams are output for rendering within separate user interface tiles of conferencing software.

20 Claims, 8 Drawing Sheets

Related U.S. Application Data

(60) Provisional application No. 63/303,276, filed on Jan. 26, 2022.

(56) References Cited

U.S. PATENT DOCUMENTS

| | | | |
|---|---|---|---|
| 7,119,829 | B2 | 10/2006 | Leonard et al. |
| 7,428,000 | B2 | 9/2008 | Cutler et al. |
| 7,668,907 | B1 | 2/2010 | Janakiraman et al. |
| 8,150,155 | B2 | 4/2012 | El-Maleh et al. |
| 8,624,955 | B2 | 1/2014 | Watson et al. |
| 8,797,376 | B2 | 8/2014 | Saleh et al. |
| 8,842,161 | B2 | 9/2014 | Feng et al. |
| 8,878,893 | B2 | 11/2014 | Andresen et al. |
| 9,055,189 | B2 | 6/2015 | Su |
| 9,100,540 | B1 | 8/2015 | Gates et al. |
| 9,237,307 | B1 * | 1/2016 | Vendrow ............... H04N 7/152 |
| 9,294,726 | B2 | 3/2016 | Decker et al. |
| 9,591,479 | B1 | 3/2017 | Leavy et al. |
| 9,706,171 | B1 | 7/2017 | Riley et al. |
| 9,769,424 | B2 | 9/2017 | Michot |
| 9,774,823 | B1 | 9/2017 | Gadnir et al. |
| 9,858,936 | B2 | 1/2018 | Cartwright et al. |
| 9,942,518 | B1 | 4/2018 | Tangeland et al. |
| 10,057,707 | B2 | 8/2018 | Cartwright et al. |
| 10,075,672 | B2 | 9/2018 | Pell |
| 10,104,338 | B2 | 10/2018 | Goesnar |
| 10,187,579 | B1 | 1/2019 | Wang et al. |
| 10,440,325 | B1 | 10/2019 | Boxwell et al. |
| 10,516,852 | B2 | 12/2019 | Theien et al. |
| 10,522,151 | B2 | 12/2019 | Cartwright et al. |
| 10,574,899 | B2 | 2/2020 | Wang et al. |
| 10,778,941 | B1 | 9/2020 | Childress, Jr. et al. |
| 10,904,485 | B1 | 1/2021 | Childress, Jr. et al. |
| 10,939,045 | B2 | 3/2021 | Wang et al. |
| 10,991,108 | B2 | 4/2021 | Schnittman et al. |
| 11,012,498 | B1 | 5/2021 | Hinnant et al. |
| 11,064,256 | B1 | 7/2021 | Voss et al. |
| 11,076,127 | B1 | 7/2021 | Schaefer et al. |
| 11,082,661 | B1 | 8/2021 | Pollefeys |
| 11,165,597 | B1 | 11/2021 | Matsuguma et al. |
| 11,212,129 | B1 | 12/2021 | Sipcic et al. |
| 11,350,029 | B1 | 5/2022 | Ostap et al. |
| 11,677,907 | B2 | 6/2023 | Goggins |
| 11,722,639 | B2 | 8/2023 | Jiang et al. |
| 11,736,660 | B2 | 8/2023 | Smith et al. |
| 11,765,318 | B2 | 9/2023 | Kies et al. |
| 11,863,906 | B2 | 1/2024 | Han et al. |
| 2002/0113862 | A1 | 8/2002 | Center et al. |
| 2003/0169285 | A1 | 9/2003 | Smith et al. |
| 2004/0263611 | A1 | 12/2004 | Cutler |
| 2004/0263636 | A1 | 12/2004 | Cutler et al. |
| 2005/0078171 | A1 | 4/2005 | Firestone et al. |
| 2005/0081160 | A1 | 4/2005 | Wee et al. |
| 2005/0190768 | A1 | 9/2005 | Cutler |
| 2006/0023106 | A1 | 2/2006 | Yee et al. |
| 2006/0092269 | A1 | 5/2006 | Baird et al. |
| 2006/0244817 | A1 | 11/2006 | Harville et al. |
| 2006/0291478 | A1 | 12/2006 | Cutler et al. |
| 2007/0153091 | A1 | 7/2007 | Watlington et al. |
| 2007/0285504 | A1 | 12/2007 | Hesse |
| 2008/0184115 | A1 * | 7/2008 | Back ..................... G06Q 10/00 715/702 |
| 2008/0273078 | A1 | 11/2008 | Grasley et al. |
| 2008/0297586 | A1 | 12/2008 | Kurtz et al. |
| 2008/0297587 | A1 | 12/2008 | Kurtz et al. |
| 2008/0297588 | A1 | 12/2008 | Kurtz et al. |
| 2008/0297589 | A1 | 12/2008 | Kurtz et al. |
| 2009/0015658 | A1 | 1/2009 | Enstad et al. |
| 2009/0147070 | A1 | 6/2009 | Marathe et al. |
| 2009/0207233 | A1 | 8/2009 | Mauchly et al. |
| 2009/0210491 | A1 | 8/2009 | Thakkar et al. |
| 2010/0118112 | A1 | 5/2010 | Nimri et al. |
| 2010/0123770 | A1 | 5/2010 | Friel et al. |
| 2010/0238262 | A1 | 9/2010 | Kurtz et al. |
| 2011/0085017 | A1 | 4/2011 | Robinson et al. |
| 2011/0279631 | A1 | 11/2011 | Ranganath et al. |
| 2011/0285808 | A1 | 11/2011 | Feng et al. |
| 2012/0093365 | A1 | 4/2012 | Aragane et al. |
| 2012/0212668 | A1 | 8/2012 | Schultz et al. |
| 2012/0293606 | A1 | 11/2012 | Watson et al. |
| 2012/0320141 | A1 | 12/2012 | Bowen et al. |
| 2013/0027505 | A1 | 1/2013 | Ranganath et al. |
| 2013/0076853 | A1 | 3/2013 | Diao |
| 2013/0083153 | A1 | 4/2013 | Lindbergh |
| 2013/0088565 | A1 | 4/2013 | Buckler |
| 2013/0194374 | A1 | 8/2013 | Kieft et al. |
| 2013/0198629 | A1 | 8/2013 | Tandon et al. |
| 2013/0321564 | A1 | 12/2013 | Smith et al. |
| 2013/0342636 | A1 | 12/2013 | Tian |
| 2014/0002582 | A1 | 1/2014 | Bear et al. |
| 2014/0104370 | A1 | 4/2014 | Calman et al. |
| 2014/0253671 | A1 | 9/2014 | Bentley et al. |
| 2014/0267562 | A1 | 9/2014 | Lemmey et al. |
| 2014/0267563 | A1 | 9/2014 | Baca et al. |
| 2015/0085065 | A1 | 3/2015 | Sun et al. |
| 2015/0092009 | A1 | 4/2015 | DeLuca et al. |
| 2015/0181164 | A1 | 6/2015 | Yang et al. |
| 2015/0195489 | A1 | 7/2015 | Sobti et al. |
| 2015/0237302 | A1 | 8/2015 | Cox et al. |
| 2016/0057385 | A1 | 2/2016 | Burenius |
| 2016/0073055 | A1 | 3/2016 | Marsh |
| 2016/0088259 | A1 | 3/2016 | Anderson et al. |
| 2016/0105642 | A1 | 4/2016 | Nagase et al. |
| 2016/0173823 | A1 | 6/2016 | Duckworth et al. |
| 2016/0212329 | A1 | 7/2016 | Choe et al. |
| 2016/0277712 | A1 | 9/2016 | Michot |
| 2017/0094222 | A1 | 3/2017 | Tangeland et al. |
| 2017/0099461 | A1 | 4/2017 | Nimri et al. |
| 2017/0140791 | A1 | 5/2017 | Das et al. |
| 2018/0007097 | A1 | 1/2018 | Malatesha et al. |
| 2018/0063206 | A1 | 3/2018 | Faulkner et al. |
| 2018/0063479 | A1 | 3/2018 | Nimri et al. |
| 2018/0063480 | A1 | 3/2018 | Luks et al. |
| 2018/0098026 | A1 | 4/2018 | Gadnir et al. |
| 2018/0124128 | A1 | 5/2018 | Faulkner et al. |
| 2018/0124136 | A1 | 5/2018 | Faulkner et al. |
| 2018/0203577 | A1 | 7/2018 | Astavans et al. |
| 2018/0225852 | A1 | 8/2018 | Um et al. |
| 2018/0232920 | A1 | 8/2018 | Faulkner et al. |
| 2019/0215464 | A1 | 7/2019 | Kumar et al. |
| 2019/0222892 | A1 | 7/2019 | Faulkner et al. |
| 2019/0341050 | A1 | 11/2019 | Diamant et al. |
| 2020/0099890 | A1 | 3/2020 | Tanaka et al. |
| 2020/0126513 | A1 | 4/2020 | Lau et al. |
| 2020/0260049 | A1 | 8/2020 | Erna |
| 2020/0267427 | A1 | 8/2020 | Rogers et al. |
| 2020/0275058 | A1 | 8/2020 | Graham et al. |
| 2020/0403817 | A1 | 12/2020 | Daredia et al. |
| 2021/0120208 | A1 | 4/2021 | Morris et al. |
| 2021/0136846 | A1 | 5/2021 | Ponnusamy et al. |
| 2021/0210097 | A1 | 7/2021 | Diamant et al. |
| 2021/0235040 | A1 | 7/2021 | Childress, Jr. et al. |
| 2021/0400142 | A1 | 12/2021 | Jorasch et al. |
| 2021/0405865 | A1 | 12/2021 | Faulkner |
| 2021/0409893 | A1 | 12/2021 | Sommer |
| 2022/0060660 | A1 | 2/2022 | Chou et al. |
| 2022/0086390 | A1 | 3/2022 | Erna et al. |
| 2022/0141259 | A1 | 5/2022 | Copley et al. |
| 2022/0319032 | A1 | 10/2022 | Fan et al. |
| 2022/0319034 | A1 | 10/2022 | Fan et al. |
| 2022/0353305 | A1 | 11/2022 | Han et al. |
| 2022/0353465 | A1 | 11/2022 | Smith |
| 2022/0400216 | A1 | 12/2022 | Wang et al. |
| 2023/0081041 | A1 | 3/2023 | Lee et al. |
| 2023/0081717 | A1 | 3/2023 | Hoang et al. |
| 2023/0092618 | A1 | 3/2023 | Mayer et al. |
| 2023/0138434 | A1 | 5/2023 | Thiel |
| 2023/0138534 | A1 | 5/2023 | Adams et al. |

FOREIGN PATENT DOCUMENTS

| | | | |
|---|---|---|---|
| WO | 2022046810 | A2 | 3/2022 |
| WO | 2022078656 | A1 | 4/2022 |

(56) References Cited

FOREIGN PATENT DOCUMENTS

OTHER PUBLICATIONS

International Search Report and Written Opinion mailed on Jul. 25, 2022 in corresponding PCT Application No. PCT/US2022/024822.
International Search Report and Written Opinion mailed on Dec. 22, 2022 in corresponding PCT Application No. PCT/US2022/042860.
International Search Report and Written Opinion mailed on May 8, 2023 in corresponding PCT Application No. PCT/US2023/011368.
Paul Chippendale and Oswald Lanz: "Optimised Meeting Recording and Annotation Using Real-Time Video Analysis", in: Andrej Popescu-Selis: "Machine Learning for Multimodal Interaction", Proc. of 5th MLMI workshop, Sep. 10, 2008 (Sep. 10, 2008), pp. 109-120, XP055543840, Internet Retrieved from the Internet: URL:https://link.springer.com/content/pdf/10.1007/978-3-540-85853-9.pdf [retrieved on Jan. 17, 2019].
Rasmussen Troels Ammitsbol et al: "SceneCam: Improving Multticamera Remote Collaboration using Augmented Reality", 2019 IEEE International Symposium on Mixed and Augmented Reality Adjunct (!SMAR-Adjunct), IEEE, Oct. 10, 2019 (Oct. 10, 2019), pp. 28-33, XP033688529, DOI: 10.1109/ISMAR-ADJUNCT.2019.00023 [retrieved on Jan. 7, 2020].

* cited by examiner

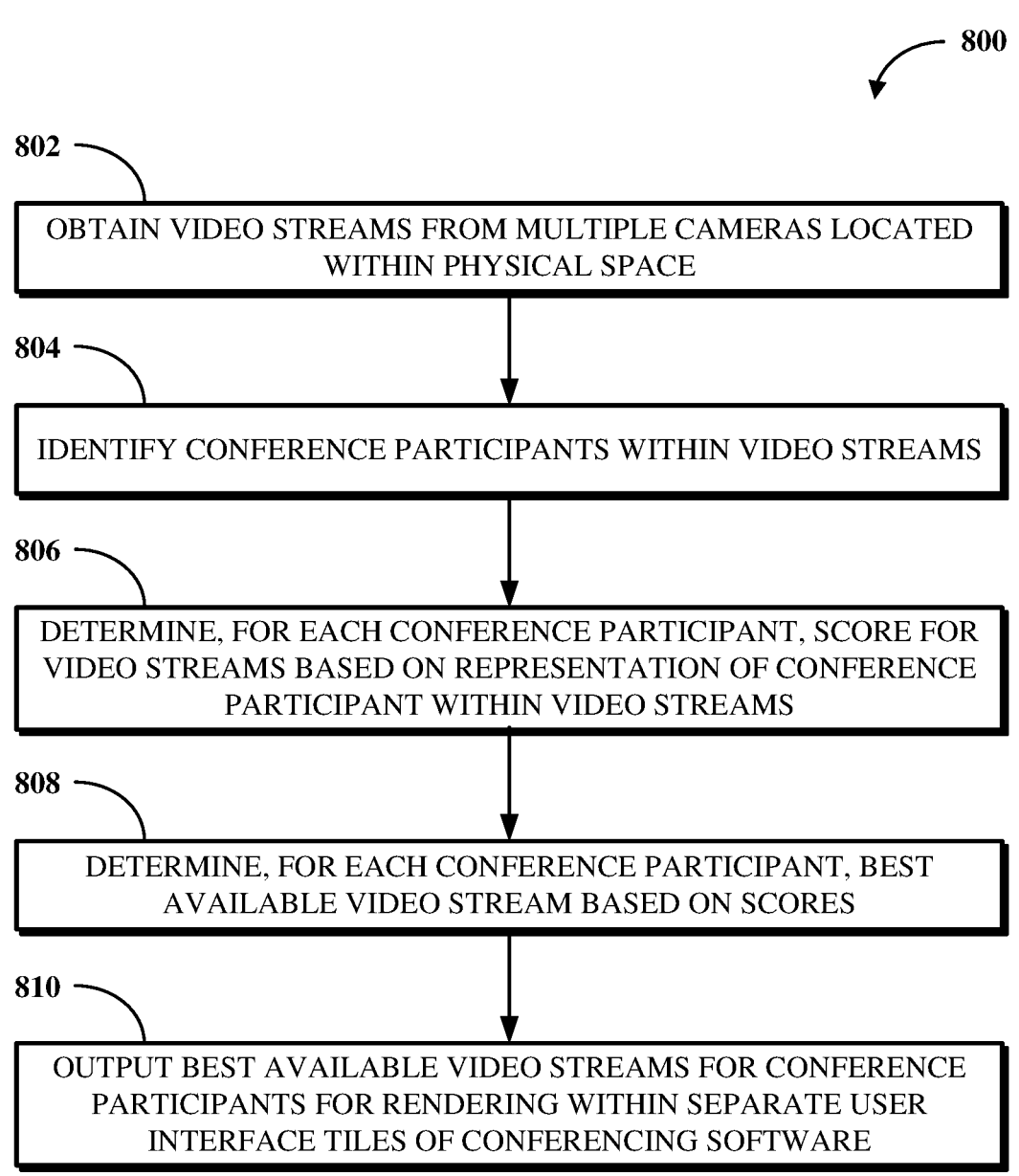

800

802
OBTAIN VIDEO STREAMS FROM MULTIPLE CAMERAS LOCATED WITHIN PHYSICAL SPACE

804
IDENTIFY CONFERENCE PARTICIPANTS WITHIN VIDEO STREAMS

806
DETERMINE, FOR EACH CONFERENCE PARTICIPANT, SCORE FOR VIDEO STREAMS BASED ON REPRESENTATION OF CONFERENCE PARTICIPANT WITHIN VIDEO STREAMS

808
DETERMINE, FOR EACH CONFERENCE PARTICIPANT, BEST AVAILABLE VIDEO STREAM BASED ON SCORES

810
OUTPUT BEST AVAILABLE VIDEO STREAMS FOR CONFERENCE PARTICIPANTS FOR RENDERING WITHIN SEPARATE USER INTERFACE TILES OF CONFERENCING SOFTWARE

FIG. 8

MULTI-CAMERA VIDEO STREAM SCORING AND SELECTION FOR IN-PERSON CONFERENCE PARTICIPANTS

CROSS-REFERENCE TO RELATED APPLICATION(S)

This disclosure is a continuation of U.S. patent application Ser. No. 17/701,126, filed Mar. 22, 2022, which claims the benefit of U.S. Provisional Application Ser. No. 63/303,276, filed Jan. 26, 2022, the entire disclosures of which are incorporated herein by reference.

FIELD

This disclosure generally relates to multi-camera video stream selection for in-person video conference participants, and, more specifically, to determining a best available video stream for each conference participant within a conference room from amongst multiple video streams obtained from multiple cameras within the conference room based on a representation of the conference participant.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 8 is a flowchart of an example of a technique for multi-camera video stream selection.

DETAILED DESCRIPTION

Figure 1:
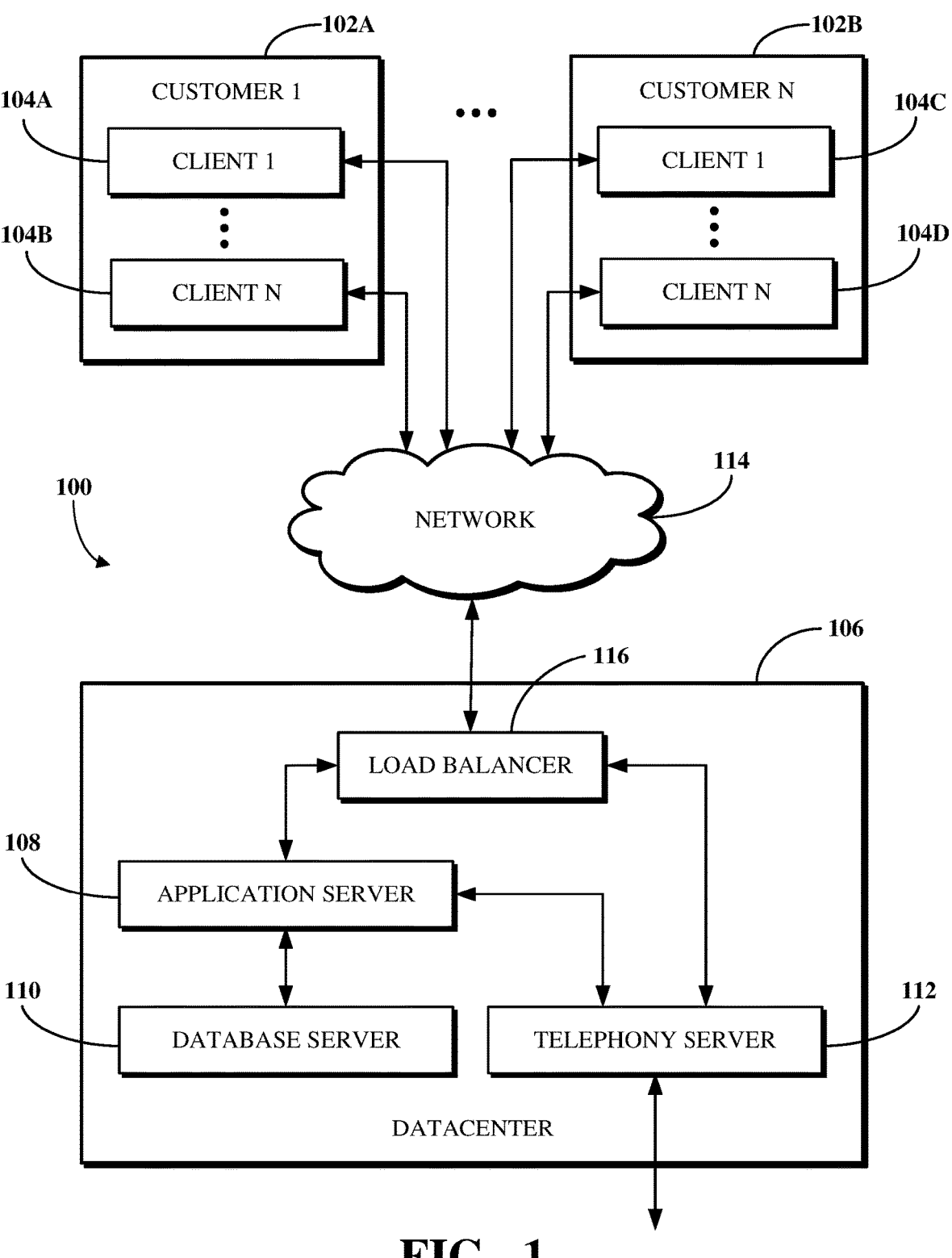
FIG. 1 is a block diagram of an example of an electronic computing and communications system.

Conferencing software is frequently used across various industries to support conferences between participants in multiple locations. In many cases, one or more of the conference participants is physically located in and connects to the conferencing software from a conference room (e.g., in an office setting), and other conference participants connect to the conferencing software from one or more remote locations. Conferencing software thus enables people to conduct conferences without requiring them to be physically present with one another. Conferencing software may be available as a standalone software product or it may be integrated within a software platform, such as a unified communications as a service (UCaaS) platform.

In many cases, conferencing software uses video media to output, in real-time, video streams captured from endpoints connected to the conferencing software. For people physically present within a physical space, such as a conference room, a computing device within the physical space serves as the endpoint. Typically, there is a single camera within a conference room, which is usually located in a central position on one side of the conference room so as to capture most or all of the conference room within a field of view thereof, and there may be one or more microphones throughout the conference room to capture sound from persons present in the conference room. These media capture devices are typically connected to the computing device within the conference room, which transmits streams thereof to a server that implements the conferencing software. The conferencing software then renders an output video stream based on the video feed from the camera within a user interface of the conferencing software (e.g., within a user interface tile associated with the conference room) and introduces an audio feed from the one or more microphones within an audio channel of the conference.

A user interface of conventional conferencing software includes a number of user interface tiles in which video feeds received from the various connected devices are separately rendered. Conference participants remotely connecting to conventional conferencing software are represented within a user interface of the conferencing software using individualized user interface tiles based on the video feeds received from their devices. In contrast, because a single video feed is received from the camera within a conference room, conference participants who are physically located within the conference room generally are all represented within the same user interface tile. However, the use of a single user interface tile to show all participants within a conference room may limit the contribution that those participants have to the overall conference experience over the conferencing software. For example, a conference participant located somewhere in the conference room will not be given the same amount of focus within the user interface of the conferencing software, which includes all of the user interface tiles, as someone who is front and center within their own individualized user interface tile. In another example, conversations between participants within the conference room may be missed or misattributed to others by remote participants who are not present in the conference room.

One solution uses a system for processing a video stream received from a camera within a physical space, such as a conference room, to identify multiple people within that video stream. The system may perform object detection looking for humans within input video streams and determine one or more regions of interest within the conference room as the output of that object detection. Each region of interest generally corresponds to one person. The system then separates each person, based on their region of interest, into their own dedicated user interface tile and causes video data for those people to be rendered within their respective user interface tiles within the conferencing software user interface. Individually representing each participant within the conference room has certain benefits, including enabling better communications between remote participants and individual participants within the conference room and enabling better visibility of those participants within the conference room for remote participants.

When this solution uses multiple cameras from within the physical space, a given person within the physical space may be identified by more than one of the cameras. In such a case, and unless the cameras which have fields of view including the given person are next to one another, the video stream obtained from one of the cameras is likely to represent the person better than the video stream obtained from the other camera or cameras. One of those video streams obtained from the multiple cameras, then, may be considered the best available video stream for the person based on one or more factors. However, determining which video stream is the best available video stream for a given person presents technical challenges related to the processing of the video streams and the representation of the given person in each. In particular, approaches may fail to accurately compare video frames from each of the subject video streams, or they may entirely omit such comparisons. In either event, the system may ultimately output for rendering within a user interface tile associated with a given person a video stream other than the best available video stream. In some cases, such as where the cameras from which the available video streams were obtained are located in different places within the physical space (e.g., on perpendicular walls), this may result in a low quality video being output for the person within the conferencing software user interface. As described above, this low quality video may negatively affect communications during the conference, such as between the subject person and remote participants.

Implementations of this disclosure address problems such as these by determining a best available video stream for each conference participant present within a physical space, such as a conference room, which includes multiple cameras. Video streams from each of the cameras which includes a given conference participant in its field of view are obtained and processed to determine scores associated with the given conference participant. The scores are determined based on representations of the conference participants within the video streams, for example, based on percentages of conference participant faces visible within the video streams, directions of conference participant faces relative to the cameras, directions of eye gaze of the conference participants relative to the cameras, and/or degrees to which conference participant faces are obscured within the video streams. The best available video stream for the conference participant is output for rendering within a user interface tile, associated with that conference participant, of conferencing software. This process may be performed for some or all conference participants. In particular, this process may be performed for all conference participants present within the physical space. In some cases, this process may also or instead be performed for one or more remote participants who have multiple cameras available to them during the conference.

Figure 7:
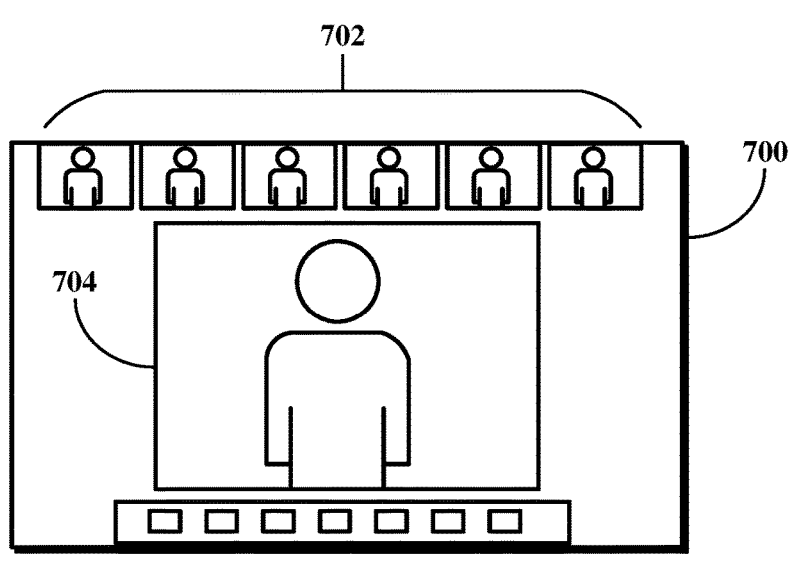
FIG. 7 is an illustration of a user interface of conferencing software within which video streams determined for conference participants are rendered within user interface tiles.

As used herein, a "user interface tile" refers to a portion of a conferencing software user interface which displays a rendered video showing one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. Examples of user interface tiles are shown in FIG. 7.

To describe some implementations in greater detail, reference is first made to examples of hardware and software structures used to implement a system for multi-camera video stream selection for in-person video conference participants. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

8

Figure 2:
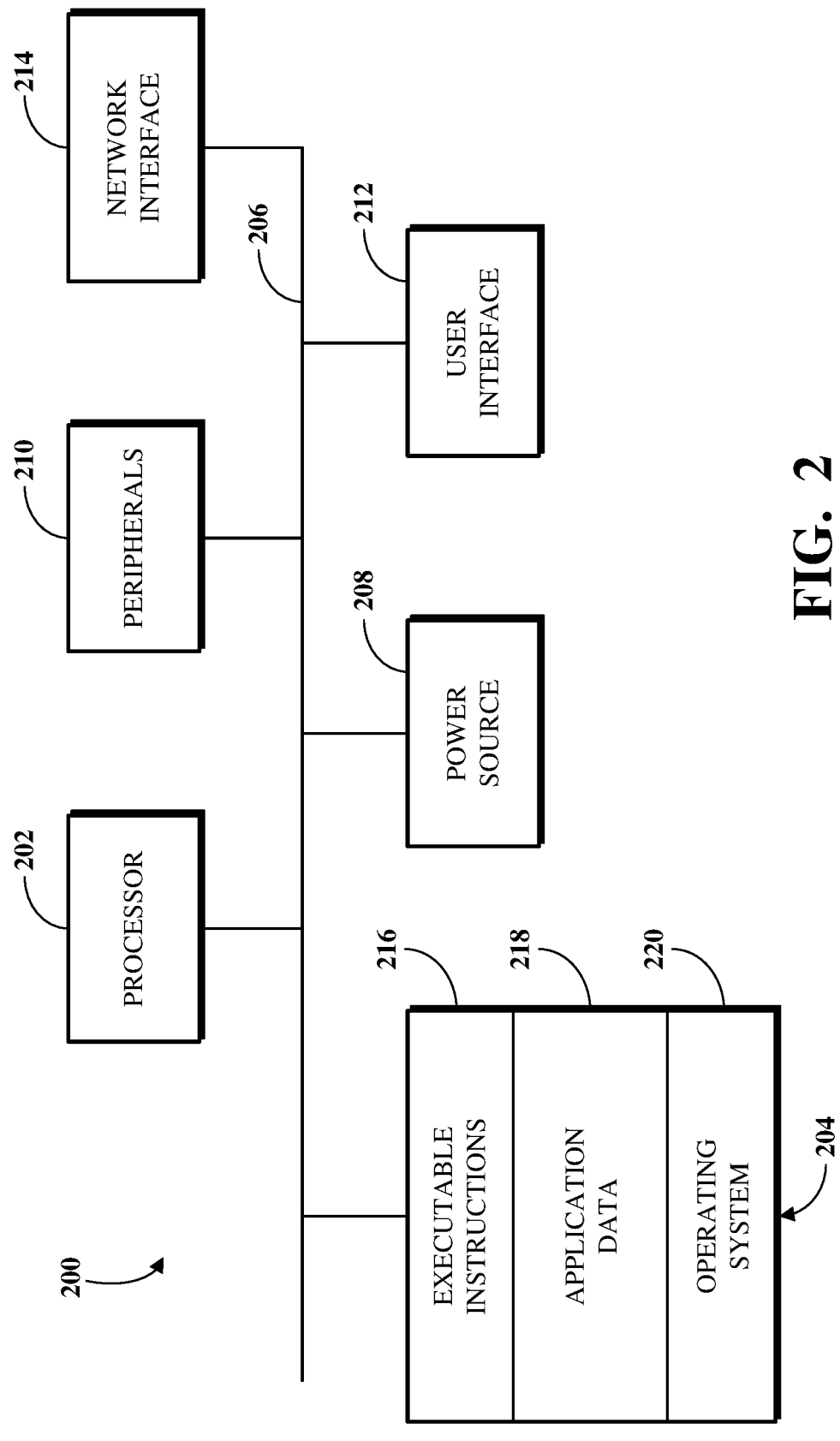
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
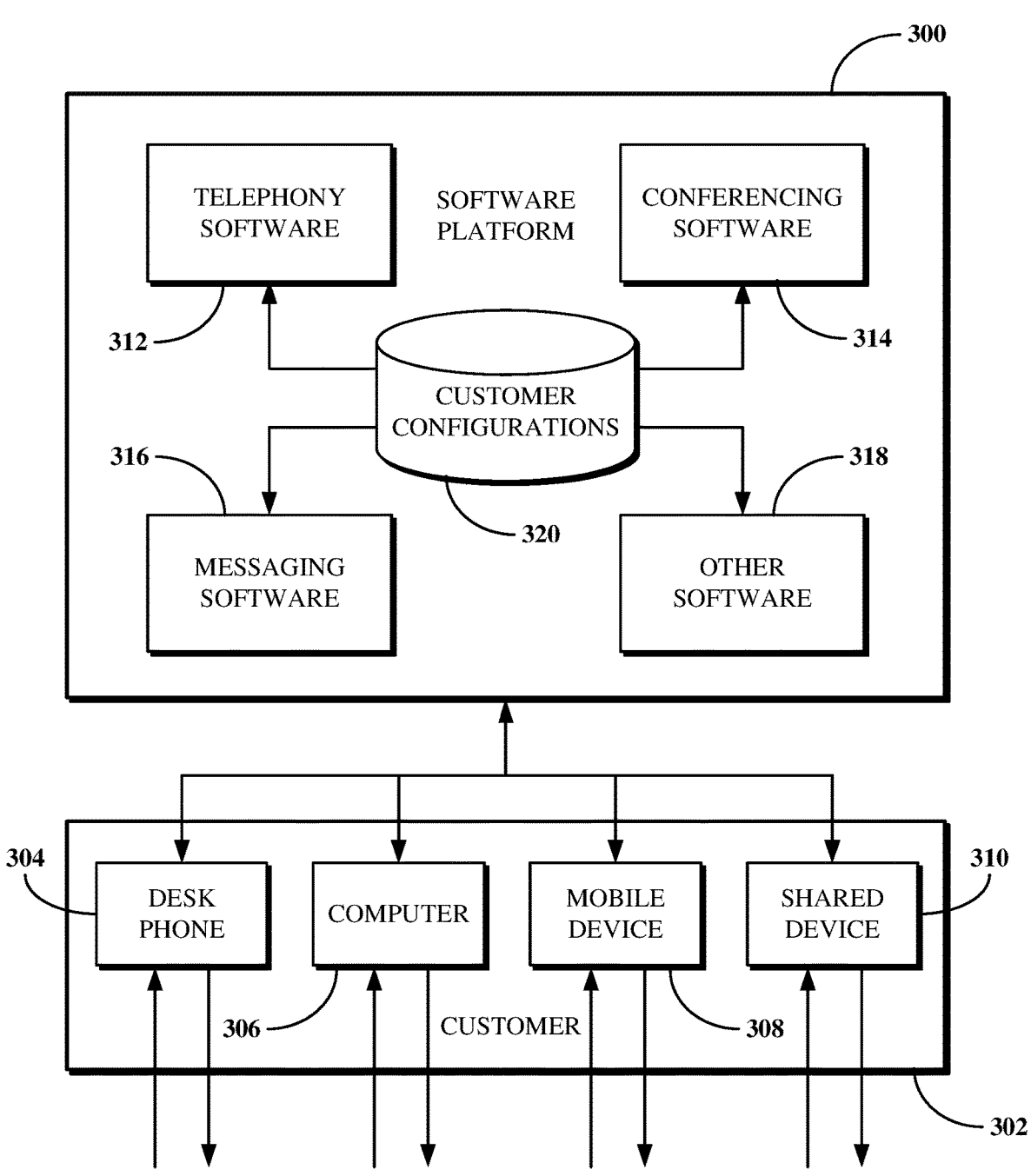
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for normalizing resolutions for video streams output for display within a software user interface.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
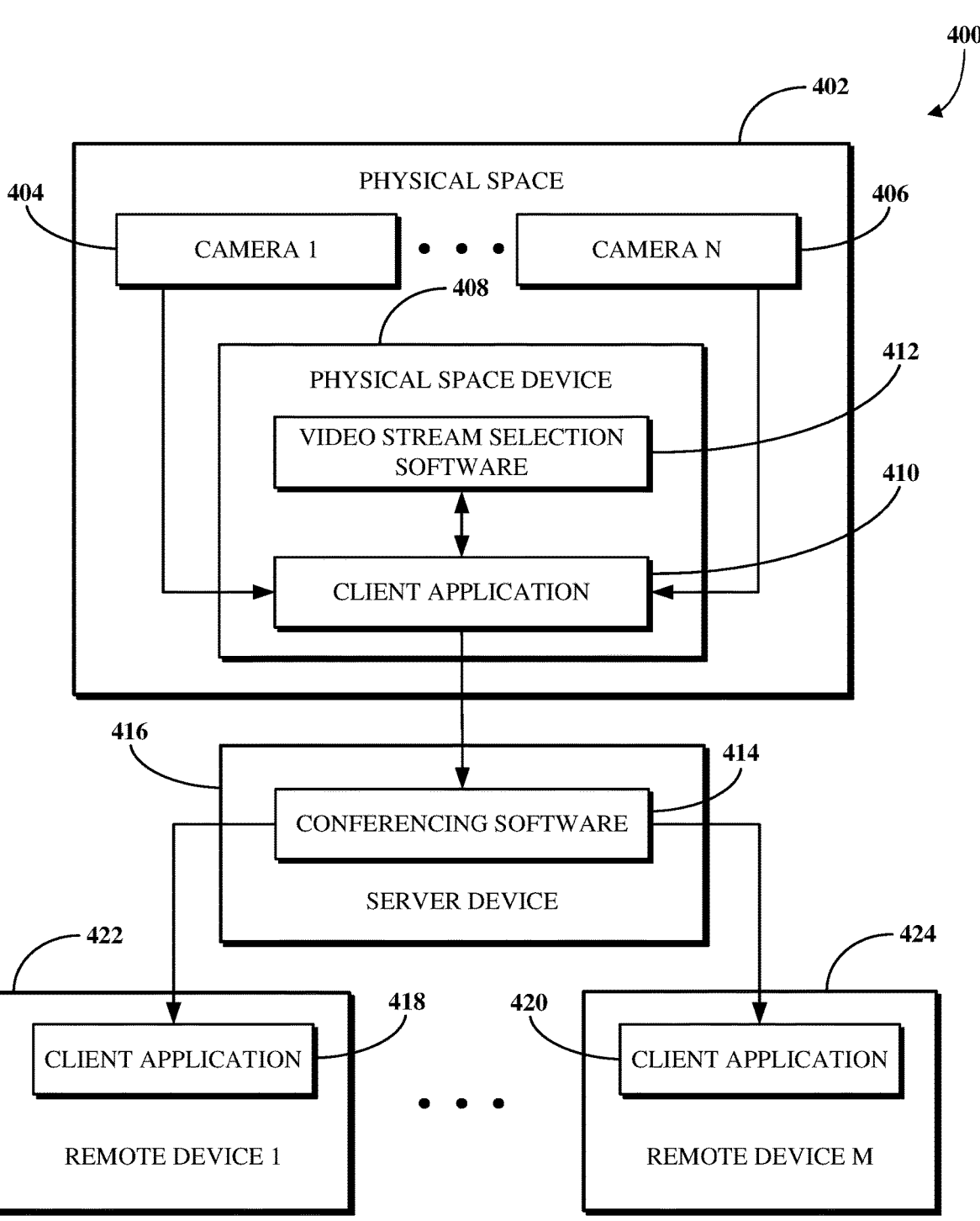
FIG. 4 is a block diagram of an example of a system for multi-camera video stream selection.

FIG. 4 is a block diagram of an example of a system 400 for multi-camera video stream selection. As shown, a physical space 402 includes multiple cameras from which video streams are obtained, including a camera 1 404 through a camera N 406, in which N is an integer greater than or equal to 2. The physical space 402 is a place within which the multiple cameras and one or more people may be located, for example, a conference room, a shared office, or a private office. The cameras 1 404 through N 406 are configured to record video data within the physical space 402. For example, the camera 1 404 may be arranged on a first wall of the physical space 402 and the camera N 406 may be arranged on a second wall of the physical space 402 perpendicular to the first wall.

Each of the cameras 1 404 through N 406 has a field of view within the physical space 402 based on an angle and position thereof. Some or all of the cameras 1 404 through N 406 may be fixed such that their respective fields of view do not change. Alternatively, some or all of the cameras 1 404 through N 406 may have mechanical or electronic pan, tilt, and/or zoom functionality for narrowing, broadening, or changing the field of view thereof. For example, the pan, tilt, and/or zoom functionality of a camera may be electronically controlled, such as by a device operator or by a software intelligence aspect, such as a machine learning model or software which uses a machine learning model for field of view adjustment. A machine learning model as used herein may be or include one or more of a neural network (e.g., a convolutional neural network, recurrent neural network, or other neural network), decision tree, vector machine, Bayesian network, genetic algorithm, deep learning system separate from a neural network, or other machine learning model.

The cameras 1 404 through N 406 are connected, using one or more wired and/or wireless connections, to a physical space device 408 located within or otherwise associated with the physical space 402. The physical space device 408 is a computing device which runs software including a client application 410 and video stream selection software 412. For example, the physical space device 408 may be a client such as one of the clients 304 through 310 shown in FIG. 3. The client application 410 connects the physical space device 408 to a conference implemented by conferencing software 414 running at a server device 416, which may, for example, be the server device 108 shown in FIG. 1. For example, the conferencing software 414 may be the conferencing software 314 shown in FIG. 3. The conference is a video-enabled conference with two or more participants in which one or more of those participants are in the physical space 402 and one or more of those participants are remote participants located external to the physical space 402.

The video stream selection software 412 includes software for determining a best available video stream for a given conference participant within the physical space 402 from amongst video streams obtained from the cameras 1 404 through N 406 and for indicating that best available video stream to the client application 410 running at the physical space device 408. The client application 410 uses that indication to output the best available video stream for rendering within a user interface tile of the conferencing software 414, such as within the client application 408 and client applications 418 through 420 running at remote devices 1 422 through M 424, in which M is an integer greater than or equal to 2. In particular, and as such, the best available video streams determined for participants within the physical space 402 are rendered within separate user interface tiles of a user interface of the conferencing software 414 at one or more devices connected to the conference, such as the physical space device 408 and the remote devices 1 422 through M 424.

The video stream selection software 412 determines a best available video stream for a given conference participant by processing video streams obtained from one or more of the cameras 1 404 through N 406 which have fields of view that include the given conference participant. A score is determined for each such video stream, and those scores are compared to determine the best available video stream from amongst those video streams. The score for a video stream is determined, based on one or more factors, based on representations of the conference participant within the video stream. An example list of the factors evaluated to determine a score includes, without limitation, a percentage of a face of the conference participant which is visible within the video stream, a direction of the face of the conference participant relative to the camera from which the video stream is obtained, a direction of an eye gaze of the conference participant relative to the camera, and/or a degree to which the face of the conference participant is obscured within the video stream. In some cases, the scores can be determined using a machine learning model trained to evaluate video streams according to one or more such factors. In some implementations, a factor of the one or more factors may correspond other than to a conference participant. For example, a factor used to determine a score for a video stream may correspond to a resolution or frame rate at which the video stream is captured or to a resolution or frame rate capability of the camera that captured the video stream.

The client applications 418 through 420 are software which communicate with the conferencing software 414 to enable the users of the remote devices 1 422 through M 424 to participate in the conference implemented using the conferencing software 414 as a remote participant. Each of the remote devices 1 422 through M 424 is a computing device and may, for example, be one of the clients 304 through 310 shown in FIG. 3. At least some of the remote devices 1 422 through M 424 include one or more capture components, such as a camera, which capture input (e.g., video data) that is then transmitted to the conferencing software 414 for rendering within a user interface tile of a user interface of the conferencing software 408. For example, an input video stream from the remote device 1 422 may be processed and output within a user interface tile associated with the user of the remote device 1 422 within the user interface of the conferencing software 414 and an input video stream from the remote device M 424 may be processed and output within a user interface tile associated with the user of the remote device M 424 within the user interface of the conferencing software 414.

A region of interest generally refers to an area (e.g., a generally rectangular space) within which a conference participant is visible within a video stream obtained from a camera of the cameras 1 404 through N 406. The client application 410 determines regions of interest associated with the conference participants within the physical space 402 based on the video streams obtained from the cameras 1 404 through N 406. For example, data obtained from a camera of the cameras 1 404 through N 406 in connection with a video stream obtained from that camera can indicate the one or more regions of interest within the video stream. In such a case, the camera may perform region of interest processing to detect the regions of interest. In another example, the client application 410 or other software at the physical space device 408 can determine the regions of interest within the video stream obtained from a camera of the cameras 1 404 through N 406 without an indication of those regions of interest from the camera. In some implementations, as will be described below, a region of interest may refer to an area within which an object other than a conference participant is visible within a video stream obtained from a camera of the cameras 1 404 through N 406.

Regardless of where it is determined, a region of interest within the physical space 402 can be determined in one or more ways. In one example, a region of interest can be determined by processing a video stream captured by a camera of the cameras 1 404 through N 406 to detect a number of people, as conference participants, within the field of view of the camera. A machine learning model trained for object detection, facial recognition, or other segmentation can process the video data of the input video stream to identify humans. For example, the machine learning model can draw bounding boxes around objects detected as having human faces, in which those objects are recognized as the conference participants and remaining video data is representative of background content. The regions of interest determined from the video stream from the camera may then be rendered within separate user interface tiles of the user interface of the conferencing software 414.

In some implementations, a region of interest may further be determined using audio data captured within the physical space 402. For example, the audio data may be captured using one or more microphones (e.g., of one or more microphone arrays) within the physical space 402. The audio data may be processed to determine the directions from which the audio data arrives at the microphones. For example, a machine learning model trained for voice activity detection or a similar tool can process the audio data to detect when the audio data includes human vocal sounds, such as from a person talking. Upon detecting voice activity within the audio data, a machine learning model trained for direction of arrival processing or a similar tool can process the audio data to determine directions of arrival indicating where the voice activity is coming from within the physical space 402. The directions of arrival may then be used to determine a conversational context within the physical space 402, and, more specifically, within a subject field of view of a camera of the cameras 1 404 through N 406 determined based on a video stream captured by the camera. The conversational context may, for example, correspond to a context and/or length of a conversation between two or more conference participants within the physical space 402. A region of interest within the subject field of view to feature within a user interface tile of the conferencing software 414 may then be determined based on the video stream and the determined conversational context.

In some implementations, the client application 410 can include the video stream selection software 412. In some implementations, the video stream selection software 412 may be implemented at the server 416 instead of at the physical space device 408. In such a case, the client application 410 may transmit some or all of the video streams obtained from the cameras 1 404 through N 406 to the server 416, and the determination of the best available video stream for some or all of the conference participants within the physical space 402 may as such be performed at the server 416 instead of at the physical space device 408.

In some implementations, one or more of the devices connected to the conferencing software 414 can connect to the conferencing software 414 other than by using a client application, such as the client applications 410 and 418 through 420. For example, the physical space device 408 and/or one or more of the remote devices 1 422 through M 424 may connect to the conference using a web application running through a web browser. In another example, the physical space device 408 and/or one or more of the remote devices 1 422 through M 424 may connect to the conference using a software application other than a web browser or a client application, for example, a non-client desktop or mobile application.

Figure 5:
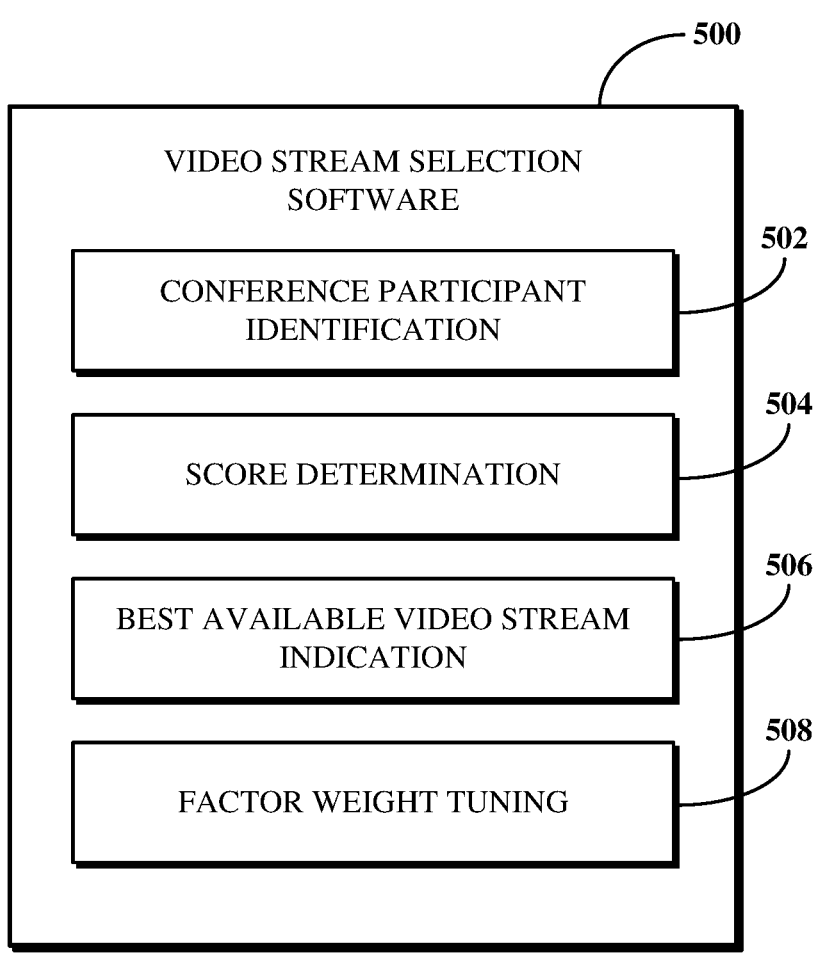
FIG. 5 is a block diagram of example functionality of video stream selection software.

FIG. 5 is a block diagram of example functionality of video stream selection software 500, which may, for example, be the video stream selection software 412 shown in FIG. 4. The video stream selection software 500 includes tools, such as programs, subprograms, functions, routines, subroutines, operations, and/or the like for determining a best available video stream for each conference participant within a physical space (e.g., a conference room) from amongst multiple video streams obtained from multiple cameras within the physical space. As shown, the video stream selection software 500 includes a conference participant identification tool 502, a score determination tool 504, a best available video stream indication tool 506, and a factor weight tuning tool 508.

The conference participant identification tool 502 identifies video streams which include representations of given conference participants. The conference participant identification tool 502 may perform object detection and recognition processing against video streams obtained from various cameras within the physical space to determine which of those video streams share an object (i.e., a conference participant). Performing object detection can include detecting a face and potentially other portions of a human body (e.g., an upper torso) within a portion of video frames of video streams obtained from multiple cameras in a physical space. Performing object recognition can then include tracking objects across video frames of the video streams, for example, by evaluating the objects detected within the portions of those video frame from the multiple cameras to determine that a same object (e.g., the same conference participant) is represented in them. For example, the object recognition can use an estimation or like process to determine that a conference participant detected within a video stream of a first camera is or is likely to be the same as a conference participant detected within a video stream of a second camera.

In some cases, the conference participant identification tool 502 may process an entire video frame of a video stream to determine whether a conference participant is or may be represented in it. In some cases, the conference participant identification tool 502 may process regions of interest detected within a video stream, such as to avoid resource expenditure from the processing of video data outside of a region of interest. For example, the conference participant identification tool 502 can use information indicating the regions of interest obtained from a camera which captured the subject video stream. In another example, the conference participant identification tool 502 can determine a region of interest on its own or use information indicating a region of interest as determined by a client application or other software for connecting a physical space device to a conference.

In some implementations, the conference participant identification tool 502 may identify video streams which include a given conference participant based on processing performed in connection with regions of interest within those video streams to identify the conference participant. For example, data obtained from a camera within the physical space may indicate a name of the conference participant, or such data can be referenced against a facial recognition model or other tool to identify the names of the conference participants represented within the video stream obtained from that camera. The conference participant identification tool 502 may thus identify the video streams to process for a given conference participant based on such name information. In another example, the identification of the conference participant for whom to identify representative video streams may be based on information associated with regions of interest.

In some such implementations, regions of interest may be determined within one or more of the video streams for more than one conference participant. For example, rather than separate each individual conference participant within the physical space into his or her own user interface tile, in some cases, two or more of those conference participants can share a user interface tile. In some cases, two or more conference participants may be determined to share a user interface tile based on a conversational context of the conference. For example, in a conference in which there is a lecturer and other conference participants are audience members who do not speak, a single region of interest may be determined for a group of the audience member conference participants. This is because those audience members will likely not be speaking and so it may be unnecessary to give them their own separate user interface tiles. In such a case, the conference participant identification tool 502 can identify the video streams which represent a given group of conference participants, whether specified in connection with a region of interest or otherwise.

The object detection and/or object recognition processing described with respect to the conference participant identification tool 502 can be performed on a discrete time interval basis (e.g., once every ten seconds or once every minute) or on an event basis (e.g., in response to determining that something about the representation of the subject conference participant within one or more of the video streams has changed, such as where the conference participant changes the direction they are facing, gets up from their seat, moves around the physical space, or begins talking after a period of them not talking). For example, the conference participant identification tool 502 can process one out of every ten frames of each of the video streams obtained from the cameras within the physical space to perform object detection and object recognition. In some implementations, the performance of object detection and/or object recognition may be limited by compute resources available for such performance, such as processing and graphical resources used for one or more machine learning models trained to perform the object detection and/or object recognition.

The score determination tool 504 processes video data associated with the video streams identified by the conference participant identification tool 502 for a given conference participant to determine scores for those video streams and to determine a best available video stream for the given conference participant based on those scores. The score determination tool 504 may be configured to process video data on one or more levels. For example, the score determination tool 504 may process video data on a frame-level such that scores are determined based on representations of given conference participants within individual video frames of video streams. In another example, the score determination tool 504 may process video data on a chunk-level, in which a chunk refers to a series of consecutive video frames, such that scores are determined based on representations of given conference participants within chunks of video streams. Other processing levels are also possible.

The score determination tool 504 determines a score for a video stream based on a representation of a subject conference participant within that video stream. The representation of a subject conference participant within a given video stream generally refers to perceptible visual qualities associated with the conference participant within that video stream. In particular, the perceptible visual qualities may relate to a face of the subject conference participant and the degree to which some or all of the face is visually perceptible within the given video stream. The scores determined by the score determination tool 504 are for a given conference participant. As such, it is possible that the same video streams can be processed by the score determination tool 504 and given different scores for different conference participants. However, it is also possible in some cases for the same video stream to be processed by the score determination tool 504 and given the same score for different conference participants. For example, this may occur where the subject conference participants are seated next to or otherwise close to one another.

The score determination tool 504 determines how well a video stream represents a conference participant, and thus determines a score for a video stream, based on one or more factors, including, without limitation, a percentage of the face of the conference participant which is visible within the video stream, a direction of the face of the conference participant relative to the camera from which the video stream is obtained, a direction of eye gaze of the conference participant relative to the camera, and/or a degree to which the face of the conference participant is obscured within the video stream. The factors, and thus the scores themselves, are intended to determine the video stream which will provide the best quality visual representation of the given conference participant at some point in time during a conference. In some cases, a model is used to weight various ones of the factors according to their relative importance. For example, a first weight may be applied to the percentage of the face of the conference participant which is visible within the video stream to indicate that it is a most important factor, and a second, lower weight may be applied to the direction of eye gaze of the conference participant relative to the camera. In some cases, the model may be a machine learning model.

The use of multiple factors for determining a score for a video stream may often be important given the potential variance in conference attendance and physical space layout. For example, depending on how full the physical space is, there may be obstructions that partially block the view of a conference participant from a video stream during one conference that are not there during another conference in the same physical space. As such, a video stream from a first camera that shows 100 percent of a face of a given conference participant will likely have a highest score of all video streams identified for the given conference participant. However, if at some point during the conference an object (e.g., another conference participant or an inanimate object placed on a surface, such as a conference room table) partially obscures the face of the given conference participant from that first camera, a video stream of a second camera that shows a lower (e.g., 75) percent of the face of the given conference participant without obstruction may be updated to have the highest score, even if the percentage of the face of the conference participant that is still visible to the first camera remains above that lower percent.

As described above, one or more of the factors used to determine the score for a video stream may correspond to a resolution or frame rate at which the video stream is captured or to a resolution or frame rate capability of the camera that captured the video stream. In particular, in some cases, all of the cameras in the physical space may be configured to capture video streams at the same resolution and/or frame rate, such as due to the cameras in the physical space being the same camera model manufactured by the same company. However, in other cases, one or more of the cameras in the physical space may be configured to capture a video stream at a resolution and/or frame rate which differs from the resolution and/or frame rate at which the other cameras in the physical space are configured to capture video streams. In some implementations, where two video streams have the same scores based on factors corresponding to a participant (e.g., percentage of their face which is visible and direction of their face relative to the camera), but one is captured at a higher resolution and/or frame rate than the other, the score for the video stream which is captured at the higher resolution and/or frame rate may be higher than the score for the other video stream.

In some implementations, a resolution adjustment and/or frame rate adjustment scheme may be used with the cameras that capture the video streams for which scores are determined. For example, a resolution adjustment scheme may correspond to operations performed for normalizing the resolutions of the subject video streams. Normalizing the resolutions of the subject video streams can include zooming into regions of interest determined for the participants in the physical space to cause the participants in the different regions of interest to appear at the same or similar sizes, determining normalized resolutions at which quality deficiencies exposed by the zooming for the regions of interest are reduced or eliminated, and causing the subject cameras in the physical space to capture their video streams at the normalized resolutions instead of the original resolutions used. In another example, a frame rate adjustment scheme may correspond to operations performed for motion-based adjustment of the frame rates of the subject video streams. Motion-based adjustment of the frame rates of the subject video streams can include determining which of the regions of interest have high motion (e.g., compared to a threshold or relative to other regions of interest), for example, based on the participants represented thereby moving frequently during the conference and instructing the subject cameras to use a higher frame rate for those regions of interest having high motion.

The normalized resolutions and/or adjusted frame rates may be evaluated in connection with or otherwise as factors of the one or more factors to determine scores for the video streams. For example, where resolution normalization is performed such that regions of interest are zoomed into to cause participants to appear at the same or similar sizes, a factor used to determine the scores may correspond to a degree to which a video stream has been zoomed into for a subject participant. In such a case, the video stream which requires a least amount of zooming for a subject participant compared to other video streams representing that participant may have a higher score (subject to other factors as may additionally be evaluated). For example, the video stream which requires the least amount of zooming for a subject participant may be desirable given that the normalized resolution for the camera that captures that video stream will likely be lower than the normalized resolutions for the cameras that capture the other video streams. One reason for this desirability is that the lower normalized resolution will require fewer compute and/or network resources and thus make resources available for other aspects of the conferencing software.

The score determination tool 504 may update scores for video streams at one or more times during a conference according to a change policy for the conference. A change policy is or otherwise includes some definition, whether by default value or user customization, for indicating how frequently video stream selection is to be performed for some or all participants in the conference. In particular, the change policy may indicate to update scores for video streams representing a given conference participant on a discrete time interval basis or on an event basis. For example, the score determination tool 504 may receive output from the conference participant identification tool 502 on a discrete time interval basis, such as where the object detection and/or object recognition performed by the conference participant identification tool 502 occurs once every ten, thirty, or sixty frames, and perform the score determination operations herein based on that output received on such an interval basis. Where a score does not change and thus a previously determined best available video stream remains the best available video stream after a score update, the same video stream will continue to be output for rendering within the user interface tile associated with the conference participant. Where a score changes in a way that results in it being the new best available video stream, a new best available video stream to be output for rendering within that user interface tile may be determined.

It is possible for the same video stream to be the best available video stream for multiple conference participants. Similarly, it is possible for a given video stream to not be the best available video stream for any conference participant. In many cases, different video streams will be best available video streams for different conference participants based on the conference participants and the cameras from which the video streams are obtained being located around the physical space rather than all within a single area thereof.

In some cases, the score determination tool 504 may determine a same score for two or more video streams for a given conference participant. In such a case, the score determination tool 504 may determine, as the best available video stream for the given conference participant, a first video stream which was received from any of the subject cameras, the video stream which has the highest resolution, the video stream from a camera which is identified or otherwise designated as a main camera, or another video stream based on other criteria.

In some implementations, where a region of interest is determined to correspond to a group of conference participants (e.g., as in the audience example described above), scores may be determined for each video stream which includes that group of conference participants. In some such implementations, the score determined for such a video stream may be based on a sum or average of scores determined for each individual conference participant of the group of conference participants. For example, separate scores can be determined for each conference participant within each of the subject video streams. The total score or average score for each of the video streams may then be compared to determine the best available video stream for that group of conference participants.

The best available video stream indication tool 506 indicates, as the best available video stream, the video stream with the highest score determined by the score determination tool 504 to other software, such as to cause the best available video stream to be output for rendering within a user interface tile associated with the given conference participant. For example, the other software may be a client application run on a computing device within the physical space (e.g., the client application 410 running on the physical space device 408, as shown in FIG. 4). In such a case, the other software transmits the best available video stream to conferencing software running at a server device (e.g., the conferencing software 414 running on the server device 416 shown in FIG. 4), which process the various video streams obtained for the conference participants and causes those video streams to be rendered within appropriate user interface tiles of a user interface of the conferencing software. In another example, the other software may be the conferencing software running at the server device. In such a case, the best available video stream indication tool 506, directly or indirectly (e.g., through a client application), transmits the best available video stream to the other software.

In some cases, the best available video stream indication tool 506 may temporarily prevent an indication of a new best available video stream (e.g., determined according to a score update by the score determination tool 504, as described above) where there have been recent or frequent changes in the indicated best available video stream during a conference. For example, even though the score determination tool 504 may determine a new best available video stream for a given conference participant on an event basis each time that conference participant changes the direction they are facing, if they are changing such direction frequently during the conference, it may become disruptive to other conference participants to have the video rendered within his or her user interface tile frequently change. As such, the best available video stream indication tool 506 may in some cases prevent an indication of a new best available video stream if a previous best available video stream indication occurred within a threshold time period (e.g., one minute). In some cases, the best available video stream indication tool 506 may prevent further indications of new best available video streams where a threshold number of best available video stream indications (e.g., ten) has already been met in a given conference, meaning that the video rendered within the user interface tile for that conference participant has already changed more than or equal to the threshold number of times.

In some cases, multiple video streams may be determined to each have a same highest score. In some such cases, the best available video stream indication tool 506 may select the one of those multiple video streams which features a higher percentage of a face of a subject conference participant. In some cases, the best available video stream indication tool 506 may rotate between ones of those multiple video streams that are each determined to have the same highest score. For example, where two video streams are determined to have the same highest score throughout all or a portion of a conference, the best available video stream indication tool 506 may indicate a first one of those two video streams for a first period of time and thereafter, based on the two video streams still having the same highest score after that period of time ends, indicate a second one of those two video streams for a next period of time. In some implementations, this rotation between ones of multiple video streams having the same highest score may be limited to certain types of conferences, such as lectures lead for some or all of the conference by a speaker in which other participants are non-speaking audience members.

The factor weight tuning tool 508 processes information associated with best available video streams determined for one or more conference participants to determine whether and by how much to adjust one or more of the weights used by the score determination tool 504 for future score determinations during the same conference and/or in future conferences. In some cases, the adjustments may be based on manual reviews during a conference or after a conference ends. For example, the factor weight tuning tool 508 or another system aspect may present summaries (e.g., in the form of images) of the video streams used for some or all of the conference participants at some portion of the conference or throughout the entire conference to one or more of the conference participants, to the host of the conference, or to another person (e.g., an administrator). The summaries may be presented to seek feedback from those persons as to whether the video streams selected for various participants were quality representations of those participants. In another example, where a machine learning model is used to determine the scores for the video streams, the factor weight tuning tool 508 or another system aspect may provide information associated with the video streams used for some or all of the conference participants at some portion of the conference or throughout the entire conference to the machine learning model for training purposes. The machine learning model may then, for example, update the weights applied to the various factors it uses on its own. For example, online learning may be used to train or retrain a machine learning model for video stream selection based on such feedback by using training data samples including images of respective video streams and portions of the feedback corresponding to those images. The online learning may improve the performance of the machine learning model for video stream selection (e.g., using the video stream selection software 500) during future conferences.

Although the tools 502 through 508 are shown as functionality of the video stream selection software 500 as a single piece of software, in some implementations, some or all of the tools 502 through 508 may exist outside of the video stream selection software 500 and/or the software platform may exclude the video stream selection software 500 while still including the some or all of tools 502 through 508 in some form elsewhere. For example, some or all of the tools 502 through 508 may be implemented by a client application such as the client application 410 shown in FIG. 4.

In some implementations, the video stream selection software 500 may include a participant polling tool for requesting and obtaining feedback associated with video streams selected for one or more participants during a conference. For example, at one or more times during the conference, image or video data associated with the best available video streams selected for one or more participants within the physical space may be presented to one or more participant devices. The users of those participant devices may interact with user interface elements to indicate, based on the image or video data, whether the best available video stream selected for a given participant is a quality representation of that participant. The video stream selection software 500 may use feedback received as interactions within those user interface elements to determine whether to maintain a given video stream for a given participant or to switch to a different video stream for that participant. For example, the feedback may include a binary indication as to whether the image or video data is a quality representation of a given participant. In another example, the feedback may include a selection of a different video stream to use for the given participant.

The image or video data presented to a participant device may include one or more video frames of video streams selected for one or more of the participants in the physical space. For example, a single video frame, as a static image, representing how a subject participant looks within a video stream selected for them may be presented. In another example, a video frame chunk, such as which includes a set of consecutive video frames representing how a subject participant looks within a video stream selected for them and motion of the subject participant may be presented. In some cases, the image or video data may include image or video data of multiple video streams (e.g., obtained from multiple cameras within the physical space) to enable the user of the participant device at which the image or video data is presented to view other video stream options selectable for the given participant.

In some cases where image or video data is presented for multiple participants, the image or video data for multiple participants may be presented side-by-side on a single user interface page. For example, a user of a participant device at which the image or video data is presented may indicate the feedback by a single click on portions of the single user interface page corresponding to each such image or video data. In other cases where image or video data is presented for multiple participants, the image or video data for multiple participants may be presented on different user interface pages. For example, a user of a participant device at which the image or video data is presented may indicate the feedback by scrolling through multiple user interface pages and interacting with separate user interface elements on each page.

In some implementations, the feedback obtained for given image or video data may be used for online learning for a machine learning model used for the video stream selection. For example, training data samples including pairs of images from the video stream selected using the machine learning model and a new video stream selected as the feedback or a portion thereof may be used to train or retrain the machine learning model. The machine learning model can evaluate these training data samples to recognize patterns in the feedback and to determine to inference future video stream data during future conferences based on those patterns.

In some implementations, video streams selected for participants within the physical space may be presented to devices of remote participants. For example, a remote participant connected to the conferencing software at which video streams selected for the participants in the physical space are rendered within separate user interface tiles may receive image or video data within a user interface of the conferencing software, within a separate user interface (e.g., a prompt) of a client application associated with the conferencing software, or within a different user interface. In some implementations, video streams selected for participants within the physical space may be presented to devices of participants within the physical space. For example, a participant within the physical space may use the physical space device used to connect the participants within the physical space to the conferencing software to indicate feedback for the image or video data. In another example, a participant within the physical space may use a companion device to indicate feedback for the image or video data. A companion device may be or otherwise refer to a device used by an in-person participant to connect to the conferencing software or related services thereof (e.g., whiteboarding software or chat software used in connection with the conferencing software) for use during the conference. In some implementations, image or video data for a given participant may be presented to a device associated with that participant (e.g., a companion device of that participant). Presenting the image or video data to the device of the given participant enables that participant to indicate whether they like the way they appear within the video stream selected for them.

In some implementations, the video stream selection performed by or otherwise using the video stream selection software 500 may be performed for objects in addition to or instead of for conference participants. For example, multiple video streams captured using cameras in the physical space may each include a representation of an object other than a conference participant. Regions of interests associated with the object within those video streams can be determined and processed according to the tools 502 through 508 to select a best available video stream for the object. In one example use case, during a conference in which multiple participants are connecting via a physical space, one of the participants in the physical space may perform an action intended to draw the attention of other participants to an object, such as by holding the object up, gesturing to the object, or pointing to the object. The object may, for example, be determined by an object identification tool which uses an object detection process (e.g., via a machine learning model) to detect the object and visual indications of the action performed by the participant and an object recognition process (e.g., via the same or a different machine learning model) to determine what the object is.

In some implementations, the object recognition and/or a determination of the intention of the participant performing the action with respect to the object may be based on natural language processing performed against a real-time transcription of the conference. Based on the object being detected and determined, video streams which each include representations of the object may be evaluated (e.g., as described above with respect to the score determination tool 504) to indicate a best available video stream (e.g., as described above with respect to the best available video stream indication tool 506) for the object. A new user interface tile associated with the object is added to the user interface of the conferencing software and the best available video stream is rendered within that user interface tile to enable viewing of the object within its own dedicated user interface tile.

In some implementations, detecting and/or determining the object can include identifying a front of the object, such as based on understandings of aesthetics, dimensions, sides, or the like for objects of the same type. The score determination performed for the object may thus be based on the representation of the identified front of the object within ones of the multiple available video streams. In some implementations, a participant may use a companion device to indicate an object to be represented within its own user interface tile based on the video stream selection processes disclosed herein. For example, a client application running at the companion device may allow a user thereof to interact with portions of a video stream for one or more participants to identify an object, such as by a single click the object within a video stream, a box being drawn around the object within the video stream, or an interaction with a user interface element that causes the client application or other software to perform object detection and recognition against a given video stream to search for relevant objects (e.g., in connection with a processing of a real-time transcription of the conference or otherwise).

In some implementations, the video stream selection software 500 may limit indications of best available video streams to certain conference participants or certain numbers of conference participants. For example, where more than a threshold number of people (e.g., 50) are detected within video streams captured for the conference, the video stream selection software 500 may determine a prioritization of some or all of the detected people and use that prioritization to determine which of the people to visually represent within user interface tiles prior to, in parallel with, or after determining best available video streams for those people. In some implementations, a prioritization of detected people may use one or more of a real-time transcription of the conference, video data captured for the conference, an organizational chart for an entity associated with the conference, or a calendar invitation for the conference. For example, the real-time transcription can be processed to determine participants which are frequently speaking during the conference and accordingly designate them with a high priority. In another example, the video data captured for the conference can identify a speaker on a stage and/or moving around while most other detected people (e.g., audience members) remain seated and accordingly designate the speaker with a high priority.

Figure 6:
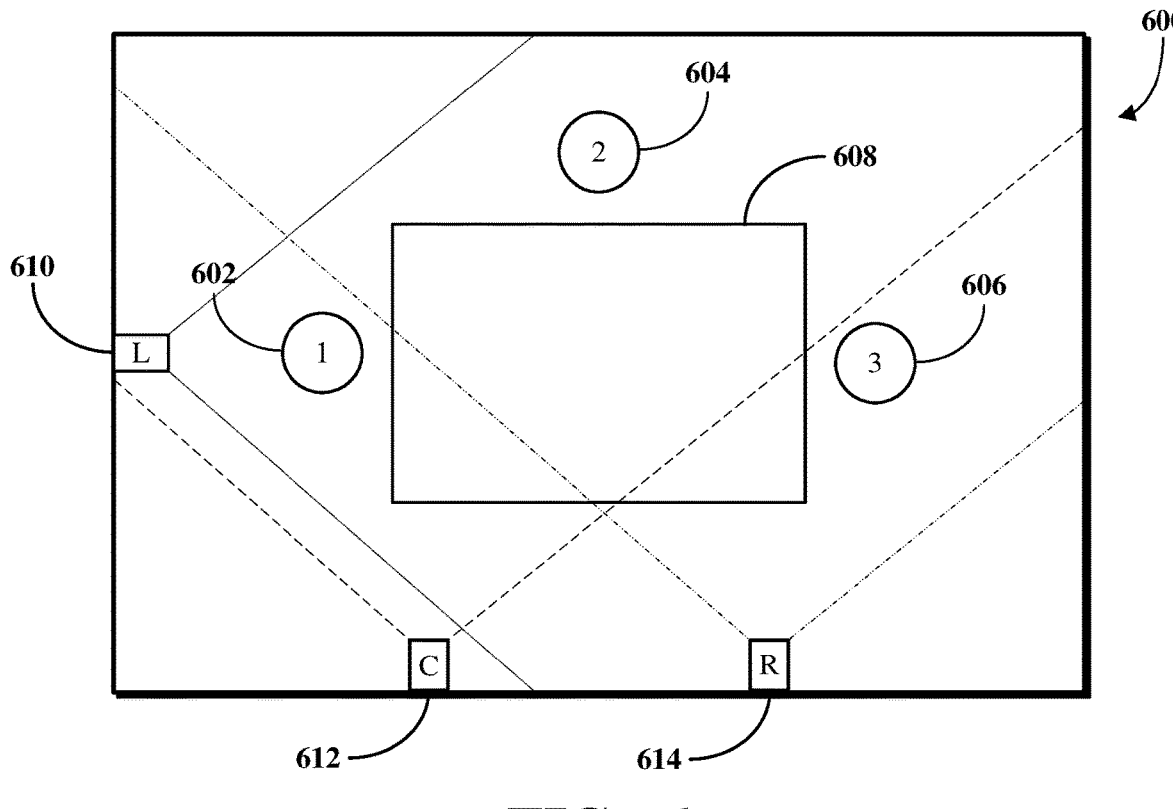
FIG. 6 is an illustration of an example of a conference room within which conference participants are located.

FIG. 6 is an illustration of an example of a physical space 600, which in this example is a conference room, within which conference participants 602, 604, and 606 are located. The physical space 600 may, for example, be the physical space 402 shown in FIG. 4. The conference participants 602, 604, and 606, who are respectively labeled as participants 1, 2, and 3, are seated around a conference table 608. Cameras 610, 612, and 614, which may, for example, be the cameras 1 404 through N 406 shown in FIG. 4, are located within the physical space 600. In particular, the camera 610, which is labeled as camera L (i.e., left), is arranged on a first wall of the physical space 600 and the cameras 612 and 614, which are respectively labeled as cameras C and R (i.e., center and right), are each arranged on a second wall of the physical space 600 perpendicular to the first wall. Each of the cameras 610, 612, and 614 has a field of view, which, as shown, are partially overlapping. In particular, all three of the conference participants 602, 604, and 606 are within the field of view of the camera 610, only the conference participants 602 and 604 are within the field of view of the camera 612, and only the conference participants 604 and 606 are within then field of view of the camera 614.

A best available video stream determined from amongst video streams obtained from the cameras 610, 612, and 614 is used to represent the conference participants 602, 604, and 606 within user interface tiles of conferencing software (e.g., the conferencing software 414 shown in FIG. 4). Video stream selection software (e.g., the video stream selection software 500 shown in FIG. 5) determines which video stream to use as the best available video stream for rendering within a user interface tile associated with a given conference participant 602, 604, or 606 based on representations of that conference participant within the video streams obtained from the cameras 610, 612, and 614.

In some cases, a video stream from a camera may not include a conference participant. For example, the field of view of the camera 612 does not include the conference participant 606, and so the video stream from the camera 612 does not represent the conference participant 606 and thus will not be determined as the best available video stream for the conference participant 606. Similarly, the field of view of the video capture device 614 does not include the conference participant 602, and so the video stream from the camera 614 will not be determined as the best available video stream for conference participant 602.

In other cases, a video stream from a camera 610, 612, or 614 may include a conference participant but not from a desirable angle or distance. For example, as shown, the conference participants 602 and 606 are included within the field of view of the camera 610. However, a video stream from the camera 610 should not be used for a user interface tile of the conference participant 602, and a video stream from a different camera may be better for a user interface tile of the conference participant 606. Regarding the conference participant 602, the conference participant 602 is facing away from the camera 610, and video of the back of the head of the conference participant 602 is not useful. A score for the video stream of the camera 610 will likely be low for the conference participant 602. As such, and because the conference participant 602 is not included in the field of view of the camera 614, the video stream from the camera 612 will likely be used for the conference participant 602.

Regarding the conference participant 606, who is included in the fields of view of the cameras 610 and 614, scores will be determined for video streams from both of those cameras. The camera 610 is directly facing the conference participant 606 when the conference participant 606 is facing forward, and so in some cases the score for the video stream from the camera 610 is likely to be the highest. However, in some cases, such as if the conference participant were to rotate toward the camera 614 (e.g., if a new conference participant enters the physical space 600), the video stream from the camera 614 may have a highest score given the proximity of the conference participant although the camera 614 because the conference participant 606 thereto.

As has been discussed, a video stream from a single camera can be processed to produce separate video streams to be output for rendering within separate user interface tiles for multiple conference participants. For example, a video stream from the camera 612 can be processed to determine a region of interest associated with the conference participant 602 and a region of interest associated with the conference participant 604. Video streams available for rendering within separate user interface tiles associated with the conference participants 602 and 604 may then be obtained for each of those regions of interest from the camera 612. In another example, a video stream from the camera 614 can be processed to determine a region of interest associated with the conference participant 604 and a region of interest associated with the conference participant 606. Video streams available for rendering within separate user interface tiles associated with the conference participants 604 and 606 may then be obtained for each of those regions of interest from the camera 614. Generally, each conference participant 602, 604, and 606 is represented within the user interface of the conferencing software using a single, separate user interface tile, so in the examples described above, one, but not both, of a video stream from the camera 612 or a video stream the camera 614 would be used for the conference participant 604.

FIG. 7 is an illustration of a user interface 700 of conferencing software, for example, the conferencing software 414 shown in FIG. 4, within which video streams determined for conference participants are rendered within user interface tiles. As shown, the user interface 700 is in an active speaker layout. The user interface tiles include multiple user interface tiles 702 arranged in a gallery view and a large user interface tile 704 representing an active speaker at a given time during a conference. In this active speaker layout, the active speaker whose user interface tile is shown at 704 may switch based on the conversation of the conference. At least some of the user interface tiles 702 represent conference participants within a physical space, for example, the physical space 600 shown in FIG. 6. For example, the best available video stream determined for the conference participant 602 shown in FIG. 6, the best available video stream determined for the conference participant 604 shown in FIG. 6, and the best available video stream determined for the conference participant 606 shown in FIG. 6 may be rendered within separates ones of the user interface tiles 702.

Figure 9:
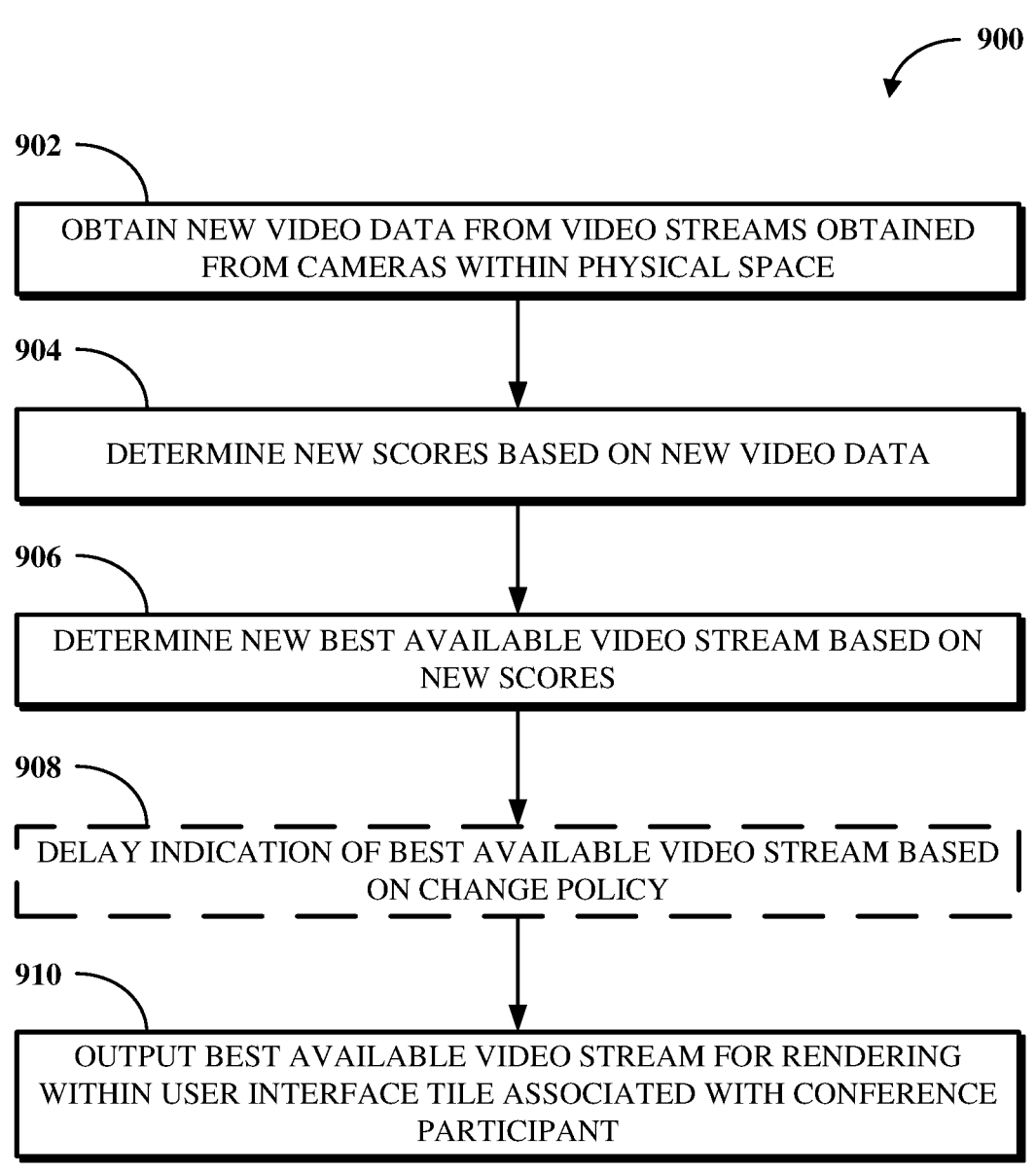
FIG. 9 is a flowchart of an example of a technique for updating a multi-camera video stream selection.

To further describe some implementations in greater detail, reference is next made to examples of techniques which may be performed by or using a system for multi-camera video stream selection for in-person video conference participants. FIG. 8 is a flowchart of an example of a technique 800 for multi-camera video stream selection. FIG. 9 is a flowchart of an example of a technique 900 for updating a multi-camera video stream selection.

The technique 800 and/or the technique 900 can be executed using computing devices, such as the systems, hardware, and software described with respect to FIGS. 1-7. The technique 800 and/or the technique 900 can be performed, for example, by executing a machine-readable program or other computer-executable instructions, such as routines, instructions, programs, or other code. The steps, or operations, of the technique 800 and/or the technique 900 or another technique, method, process, or algorithm described in connection with the implementations disclosed herein can be implemented directly in hardware, firmware, software executed by hardware, circuitry, or a combination thereof.

For simplicity of explanation, the technique 800 and the technique 900 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 8, the technique 800 for multi-camera video stream selection is shown. At 802, video streams are obtained from multiple cameras located within a physical space. The physical space may be a conference room in which multiple conference participants are located during a conference implemented using conferencing software. Alternatively, the physical space may be an office used by a single person. As a further alternative, the physical space may be a lecture hall or other large space configured for seating an audience.

At 804, multiple conference participants are identified within ones of the video streams. Conference participants may be identified based on object recognition, facial recognition, name identification, or other processing. Identifying the multiple conference participants located within the physical space can include identifying regions of interest within the video streams, in which each of the regions of interest corresponds to one or more of the multiple conference participants. In some cases, one or more machine learning models may be used for identifying the multiple conference participants. For example, a machine learning model trained for object detection may be used to identify human objects within video streams obtained from the multiple cameras in the physical space. The same machine learning model or a different machine learning model, trained for object recognition, may be used to recognize each individual conference participant across multiple video streams from the cameras. For example, the machine learning model used for object recognition may process video stream data obtained from some or all of the cameras in the physical space to determine which of the video streams include which of the conference participants.

At 806, for each of the multiple conference participants, a score is determined for each video stream within which the conference participant is identified based on a representation of that conference participant within the video stream. The score is determined based on one or more factors, including, without limitation, a percentage of the face of the conference participant which is visible within the video stream, a direction of the face of the conference participant relative to the camera from which the video stream is obtained, a direction of eye gaze of the conference participant relative to the camera, and/or a degree to which the face of the conference participant is obscured within the video stream. For example, to determine a score for a video stream from a camera for a conference participant of the multiple conference participants, a percentage of a face of the conference participant which is visible within the video stream may be weighed against one or more of a direction of a face of the conference participant relative to the camera, a direction of eye gaze of the conference participant relative to the camera, or a degree to which a face of the conference participant is obscured within the video stream. Determining the scores for a conference participant of the multiple conference participants can include determining scores for a subset of the video streams for a conference participant of the multiple conference participants by evaluating representations of the conference participant within each video stream of the subset of video streams according to one or more factors.

At 808, for each of the multiple conference participants, a best available video stream is determined based on the scores. The best available video stream for a given conference participant is determined as the video stream having the highest one of the scores determined for the conference participant. In some cases, where multiple video streams for a conference participant have the same highest score, one of those multiple video streams which includes a highest percentage of the face of the conference participant may be selected as the best available video stream for the conference participant. Different video streams and thus different cameras may be selected for different conference participants. For example, the best available video stream for a first conference participant of the multiple conference participants may be from a first camera of the multiple cameras and the best available video stream for a second conference participant of the multiple conference participants may be from a second camera of the cameras.

At 810, the best available video streams determined for the multiple conference participants are output for rendering within separate user interface tiles of conferencing software. The best available video streams may be output at the same time or at separate times. For example, where the score determination is performed on a discrete time interval basis, best available video streams may be output at a discrete time interval basis for some or all of the conference participants. In another example, where the score determination is performed on an event basis, best available video streams may be output one at a time or in batches based on events detected with respect to the conference participants. In some cases, the outputting of a best available video stream for a conference participant of the multiple conference participants is delayed according to a change policy associated with the conference implemented using the conferencing software. In some cases, the best available video stream for a conference participant may be indicated for output within a user interface tile associated with the conference participant based on a change policy threshold being met.

In some implementations, the technique 800 can include adjusting one or more weights applied to one or more factors used to determine the scores according to output of a machine learning model trained using participant input based on the best available video streams determined for at least some of the multiple conference participants. For example, the weights may be adjusted during the conference or after the conference ends.

In some implementations the technique 800 can include polling one or more participant devices connected to a conference implemented by the conferencing software for selections of ones of the video streams for ones of the multiple conference participants, and determining new best available video streams for the ones of the multiple conference participants based on the selections. For example, the polling can include presenting data associated with one or more of the video streams to one or more participant devices connected to the conferencing software. In such a case, a new best available video stream may be determined for a conference participant of the multiple conference participants based on feedback received from the one or more participant devices responsive to the data presentation. In another example, the polling can include presenting data associated with each of the video streams which include representations of a conference participant to a companion device of the conference participant while the conference participant is located within the physical space. In such a case, a new best available video stream may be determined for the conference participant based on feedback indicating a selection of one of the video streams which include the representations of the conference participant at the companion device.

In some implementations, the technique 800 can include retraining a machine learning model used for the score determination according to training data samples representing a determination of a first best available video stream for a conference participant of the multiple conference participants based on a score determined for the best available video stream and representing a determination of a second best available video stream for the conference participant based on a selection of a different video stream responsive to a polling of one or more conference participants during a conference implemented using the conferencing software.

Referring next to FIG. 9, the technique 900 for updating a multi-camera video stream selection is shown. At 902, new video data is obtained from video streams obtained from cameras within a physical space for a given conference participant. The new video data includes or otherwise refers to video data captured after video data used to previously determine scores for the video streams. In some cases, new video data is obtained for each of the video streams within which the conference participant is represented. In some cases, new video data is obtained for one or more, but not all, of those video streams.

At 904, new scores are determined for the video streams based on the new video data. The new scores determined for the video streams may be determined in the same manner as described above with respect to FIG. 8. The new scores may be determined on a discrete time interval basis or an event basis.

At 906, a new best available video stream is determined based on the new scores. Where new scores are determined for all of the video streams which include a representation of the conference participant, the new best available video stream is determined as the one of those video streams having the highest new score. Where new scores are determined for some, but not all, of those video streams, the new best available video stream may be determined by comparing the new scores against the score of the video stream currently output for rendering within the user interface tile associated with the conference participant. For example, the system may save the score of the currently output video stream for a given participant for later processing.

At 908, the indication of the new best available video stream may optionally be delayed based on a change policy in place for the conference. For example, the change policy may indicate to prevent or suspend multiple changes to video streams rendered within user interface tiles of the conferencing software within a threshold period of time or to limit a total number of changes to video streams rendered within user interface tiles of the conferencing software for some or all of the conference.

At 910, after the optional delay based on the change policy (if applicable) or otherwise in response to the determination of the best available video stream, the best available video stream is output for rendering within a user interface tile associated with the conference participant of conferencing software.

The implementations of this disclosure correspond to methods, non-transitory computer readable media, apparatuses, systems, devices, and the like. In some implementations, a method comprises identifying multiple conference participants located within a physical space including multiple cameras; for each of the multiple conference participants: determining scores for video streams from at least some of the multiple cameras based on a representation of the conference participant within the video streams; and determining, as a best available video stream for the conference participant, a video stream having a highest score of the scores; and outputting the best available video streams for the multiple conference participants for rendering within separate user interface tiles of conferencing software. In some implementations, a non-transitory computer readable medium stores instructions operable to cause one or more processors to perform operations comprising identifying multiple conference participants located within a physical space including multiple cameras; for each of the multiple conference participants: determining scores for video streams from at least some of the multiple cameras based on a representation of the conference participant within the video streams; and determining, as a best available video stream for the conference participant, a video stream having a highest score of the scores; and outputting the best available video streams for the multiple conference participants for rendering within separate user interface tiles of conferencing software. In some implementations, an apparatus comprises a memory and a processor configured to execute instructions stored in the memory to identify multiple conference participants located within a physical space including multiple cameras; for each of the multiple conference participants: determine scores for video streams from at least some of the multiple cameras based on a representation of the conference participant within the video streams; and determine, as a best available video stream for the conference participant, a video stream having a highest score of the scores; and output the best available video streams for the multiple conference participants for rendering within separate user interface tiles of conferencing software.

In some implementations of the method, non-transitory computer readable medium, or apparatus, determining the scores for the video streams for a conference participant of the multiple conference participants comprises determining scores for a subset of the video streams for a conference participant of the multiple conference participants by evaluating representations of the conference participant within each video stream of the subset of video streams according to one or more factors.

In some implementations of the method, non-transitory computer readable medium, or apparatus, the best available video stream for a conference participant is indicated for output within a user interface tile associated with the conference participant based on a change policy threshold being met.

In some implementations of the method, non-transitory computer readable medium, or apparatus, new scores are determined for a conference participant of the multiple conference participants on a discrete time interval basis or an event basis, a new best available video stream is determined for the conference participant based on the updated scores, and the new best available video stream is output for rendering within a user interface tile associated with the conference participant.

In some implementations of the method, non-transitory computer readable medium, or apparatus, one or more weights applied to one or more factors used to determine the scores are adjusted according to output of a machine learning model trained using participant input based on the best available video streams determined for at least some of the multiple conference participants.

In some implementations of the method, non-transitory computer readable medium, or apparatus, data associated with one or more of the video streams are presented to one or more participant devices connected to the conferencing software, and a new best available video stream for a conference participant of the multiple conference participants is determined based on feedback received from the one or more participant devices responsive to the data presentation.

In some implementations of the method, non-transitory computer readable medium, or apparatus, data associated with each of the video streams which include representations of a conference participant are presented to a companion device of the conference participant while the conference participant is located within the physical space, and a new best available video stream for the conference participant is determined based on feedback indicating a selection of one of the video streams which include the representations of the conference participant at the companion device.

In some implementations of the method, non-transitory computer readable medium, or apparatus, identifying the multiple conference participants located within the physical space comprises identifying regions of interest within the video streams, wherein each of the regions of interest corresponds to one of the multiple conference participants.

In some implementations of the method, non-transitory computer readable medium, or apparatus, the outputting of a best available video stream for a conference participant of the multiple conference participants is delayed according to a change policy associated with a conference implemented using the conferencing software.

In some implementations of the method, non-transitory computer readable medium, or apparatus, factors used to determine a score for a video stream for a conference participant include one or more of a percentage of a face of the conference participant which is visible within the video stream, a direction of a face of the conference participant relative to the camera from which the video stream is obtained, a direction of eye gaze of the conference participant relative to the camera, or a degree to which a face of the conference participant is obscured within the video stream.

In some implementations of the method, non-transitory computer readable medium, or apparatus, for a conference participant of the multiple conference participants, a score for a video stream from a camera is determined based on a percentage of a face of the conference participant which is visible within the video stream.

In some implementations of the method, non-transitory computer readable medium, or apparatus, for a conference participant of the multiple conference participants, a score for a video stream from a camera is determined based on a direction of a face of the conference participant relative to the camera.

In some implementations of the method, non-transitory computer readable medium, or apparatus, for a conference participant of the multiple conference participants, a score for a video stream from a camera is determined based on a direction of eye gaze of the conference participant relative to the camera.

In some implementations of the method, non-transitory computer readable medium, or apparatus, for a conference participant of the multiple conference participants, a score for a video stream from a camera is determined based on a degree to which a face of the conference participant is obscured within the video stream.

In some implementations of the method, non-transitory computer readable medium, or apparatus, the best available video stream for a first conference participant of the multiple conference participants is from a first camera of the multiple cameras and the best available video stream for a second conference participant of the multiple conference participants is from a second camera of the cameras.

In some implementations of the method, non-transitory computer readable medium, or apparatus, one or more participant devices connected to a conference implemented by the conferencing software are polled for selections of ones of the video streams for ones of the multiple conference participants, and new best available video streams are determined for the ones of the multiple conference participants based on the selections.

In some implementations of the method, non-transitory computer readable medium, or apparatus, a machine learning model used for the score determination is retrained according to training data samples representing a determination of a first best available video stream for a conference participant of the multiple conference participants based on a score determined for the best available video stream and representing a determination of a second best available video stream for the conference participant based on a selection of a different video stream responsive to a polling of one or more conference participants during a conference implemented using the conferencing software.

In some implementations of the method, non-transitory computer readable medium, or apparatus, determining a score for a video stream from a camera for a conference participant of the multiple conference participants comprises weighing a percentage of a face of the conference participant which is visible within the video stream against one or more of a direction of a face of the conference participant relative to the camera, a direction of eye gaze of the conference participant relative to the camera, or a degree to which a face of the conference participant is obscured within the video stream.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

determining scores for video streams from cameras based on a representation of a conference participant within the video streams;

selecting a video stream based on the scores;

determining that a change policy related to at least one of a threshold time between video stream selection changes or a total number of video stream selection changes over a time period is met;

based on the determination that the change policy is met, providing an indication of the selected video stream for the conference participant; and outputting the selected video stream for the conference participant within a user interface tile of conferencing software based on the indication.

2. The method of claim 1, wherein determining the scores for the video streams for the conference participant comprises:

determining scores for a subset of the video streams for the conference participant by evaluating representations of the conference participant within each video stream of the subset of video streams according to one or more factors.

3. The method of claim 1, comprising:

determining other scores for video streams from multiple cameras based on a representation of a second conference participant within the video streams;

selecting a second video stream having a highest other score of the other scores, wherein the second video stream is selected to be different than the selected video stream;

providing a second indication of the selected second video stream for the second conference participant; and outputting the selected second video stream for the second conference participant for rendering within a different separate user interface tile of the conferencing software based on the second indication.

4. The method of claim 1, comprising:

determining new scores for the video streams for the conference participant on a discrete time interval basis or an event basis;

selecting a different video stream for the conference participant based on the determined new scores; and outputting the selected different video stream for rendering within the user interface tile associated with the conference participant.

5. The method of claim 1, comprising:

adjusting one or more weights applied to one or more factors used to determine the scores according to output of a machine learning model using participant input.

6. The method of claim 1, comprising:

presenting data associated with one or more of the video streams to one or more participant devices connected to the conferencing software; and selecting a different video stream for the conference participant based on feedback received from the one or more participant devices responsive to the data presentation.

7. The method of claim 1, comprising:

presenting data associated with each of the video streams which include representations of the conference participant to a companion device of the conference participant; and selecting a different video stream for the conference participant based on feedback indicating a selection of one of the video streams which include the representations of the conference participant at the companion device.

8. The method of claim 1, further comprising:

identifying regions of interest within the video streams, wherein each of the regions of interest corresponds to one of multiple conference participants.

9. The method of claim 1, wherein the outputting of a selected video stream for the conference participant is delayed according to the change policy.

10. The method of claim 1, wherein factors used to determine a score for a video stream for the conference participant include one or more of a percentage of a face of the conference participant which is visible within the video stream, a direction of a face of the conference participant relative to a camera from which the video stream is obtained, a direction the conference participant is looking relative to the camera, or a degree to which a face of the conference participant is obscured within the video stream.

11. A non-transitory computer readable medium storing instructions operable to cause one or more processors to perform operations comprising:

determining scores for video streams from cameras based on a representation of a conference participant within the video streams;

selecting a video stream based on the scores;

determining that a change policy related to at least one of a threshold time between video stream selection changes or a total number of video stream selection changes over a time period is met;

based on the determination that the change policy is met, providing an indication of the selected video stream for the conference participant; and outputting the selected video stream for the conference participant within a user interface tile of conferencing software based on the indication.

12. The non-transitory computer readable medium of claim 11, wherein the scores for each video stream are based on a percentage of a face of the conference participant which is visible within the video stream.

13. The non-transitory computer readable medium of claim 11, wherein the scores for each video stream are based on a direction of a face of the conference participant relative to a camera capturing the video stream.

14. The non-transitory computer readable medium of claim 11, wherein the scores are based on a direction the conference participant is looking relative to a camera capturing the video stream.

15. The non-transitory computer readable medium of claim 11, wherein the scores for a video stream are based on a degree to which a face of the conference participant is obscured within the video stream.

16. The non-transitory computer readable medium of claim 11, wherein the selected video stream for a first conference participant is from a first camera of the cameras and the selected video stream for a second conference participant is from a second camera of the cameras.

17. An apparatus, comprising:

a memory; and a processor configured to execute instructions stored in the memory to:

determine scores for video streams from cameras based on a representation of a conference participant within the video streams;

select a video stream based on the scores;

determine that a change policy related to at least one of a threshold time between video stream selection changes or a total number of video stream selection changes over a time period is met;

based on the determination that the change policy is met, provide an indication of the selected video stream for the conference participant; and output the selected video stream for the conference participant within a user interface tile of conferencing software.

18. The apparatus of claim 17, wherein the processor is configured to execute the instructions to:

poll one or more participant devices connected to a conference implemented by the conferencing software for selections of ones of the video streams for the conference participant; and select a new video stream for the conference participant based on the poll.

19. The apparatus of claim 17, wherein the processor is configured to execute the instructions to:

output a selected second video stream for a second conference participant for rendering within a different separate user interface tile of the conferencing software based on a second indication, wherein the selected second video stream is from a different camera than the selected video stream.

20. The apparatus of claim 17, wherein, to determine a score for a video stream from a camera for the conference participant, the processor is configured to execute instructions stored in the memory to:

weigh a percentage of a face of the conference participant which is visible within the video stream against one or more of a direction of a face of the conference participant relative to the camera, a direction of focus of the conference participant relative to the camera, or a degree to which a face of the conference participant is obscured within the video stream.

\* \* \* \* \*